(12) United States Patent
Pradeep et al.

(10) Patent No.: US 11,345,862 B2
(45) Date of Patent: May 31, 2022

(54) APPARATUS AND A METHOD FOR WASHING OF HYDROCARBON PRODUCT VAPOR

(71) Applicant: Indian Oil Corporation Limited, Mumbai (IN)

(72) Inventors: Ponoly Ramachandran Pradeep, Haryana (IN); Prantik Mondal, Haryana (IN); Terapalli Hari Venkata Devi Prasad, Haryana (IN); Satyen Kumar Das, Haryana (IN); Madhusudan Sau, Haryana (IN); Gurpreet Singh Kapur, Haryana (IN); Sankara Sri Venkata Ramakumar, Haryana (IN)

(73) Assignee: Indian Oil Corporation Limited, Mumbai (IN)

( * ) Notice: Subject to any disclaimer, the term of this patent is extended or adjusted under 35 U.S.C. 154(b) by 0 days.

(21) Appl. No.: 16/933,554

(22) Filed: Jul. 20, 2020

(65) Prior Publication Data

US 2021/0139791 A1   May 13, 2021

(30) Foreign Application Priority Data

Nov. 7, 2019 (IN) .............................. 201921045359

(51) Int. Cl.
*B01D 47/12* (2006.01)
*C10G 21/00* (2006.01)
*B01D 47/06* (2006.01)
*C10G 9/00* (2006.01)

(52) U.S. Cl.
CPC ........... *C10G 21/00* (2013.01); *B01D 47/063* (2013.01); *B01D 47/12* (2013.01); *C10G 9/005* (2013.01); *C10G 2300/208* (2013.01)

(58) Field of Classification Search
CPC ............................ B01D 47/063; B01D 47/12
See application file for complete search history.

(56) References Cited

U.S. PATENT DOCUMENTS

| | | | | |
|---|---|---|---|---|
| 2,952,632 A | * | 9/1960 | Oertling | C10G 7/00 208/361 |
| 4,621,724 A | * | 11/1986 | Godino | C10G 7/00 196/102 |
| 2008/0179165 A1 | | 7/2008 | Chen et al. | |
| 2011/0226607 A1 | * | 9/2011 | Anderson | C10G 7/08 203/84 |
| 2016/0312126 A1 | | 10/2016 | Wormsbecker et al. | |
| 2018/0312761 A1 | * | 11/2018 | Gu | C10G 9/002 |
| 2019/0344195 A1 | * | 11/2019 | Golden | C10B 27/00 |

FOREIGN PATENT DOCUMENTS

| | | |
|---|---|---|
| BE | 529069 | 6/1954 |
| CN | 204039340 U | 12/2014 |
| CN | 107532090 A | 1/2018 |

* cited by examiner

*Primary Examiner* — Randy Boyer
(74) *Attorney, Agent, or Firm* — Blank Rome LLP

(57) ABSTRACT

An apparatus and a method for washing hydrocarbon product vapor are disclosed. The apparatus comprises housing, a first wash zone at a predefined cross-section of the housing for receiving the hydrocarbon product vapor, a plurality of injection units located within the first wash zone at predetermined intervals of the length of the housing for receiving wash oil. The injection units inject oil droplets formed from the received wash oil to contact the vapor and obtain a primary washed hydrocarbon vapor within the first wash zone. Further, a second wash zone is located above and in fluid communication with the first wash zone for receiving the primary washed hydrocarbon vapor. One or more spray headers receive wash oil and spray oil droplets formed from the received wash oil to contact with the primary washed hydrocarbon vapor, thereby forming a secondary washed hydrocarbon vapor.

7 Claims, 6 Drawing Sheets

APPARATUS AND A METHOD FOR WASHING OF HYDROCARBON PRODUCT VAPOR

RELATED APPLICATION

This application claims the benefit of Indian Application No. 201921045359, filed on Nov. 7, 2019. The entire disclosure of this application is hereby incorporated by reference.

FIELD OF THE INVENTION

The present disclosure generally relates to delayed coking process. In particular, the present disclosure relates to an apparatus and a method for washing of product vapor from thermal cracking of heavy hydrocarbon residues.

BACKGROUND OF THE INVENTION

Delayed Coking is well known process where a residual oil feed is heated to its thermal cracking temperature in a furnace with multiple parallel passes. During this process, the heavy and long chain hydrocarbon molecules of the residual oil are cracked and converted into coker gas oil and petroleum coke.

Generally, in delayed coking unit the heavy hydrocarbon residue is preheated and fed into a lower, surge zone at the bottom of the main fractionator. It is further mixed with recycle liquid, which is condensed from product vapor in the fractionator, to define a pool of liquid at the bottom of the fractionator. This process occurs before the reduced crude is rapidly heated and directed to the coke drum for cracking the same into lighter and useful products. The fractionator is designed in such a manner that it has various zones for stage wise elimination of the obtained cracked products.

In one of the conventional design of fractionators a wash zone for fractionator column of a delayed coker unit has been disclosed that comprises of a trough for collecting the condensed recycle liquid at the bottom of the wash zone and an arrangement of conduits for conveying the recycle liquid, out of contact with the product vapor in the flash zone, from the wash zone to the pool recycle liquid and petroleum residue in the bottom of the fractionator. A passage is defined adjacent to the trough to allow the product vapor rising from the flash zone to pass into the wash zone.

Another known fractionator design consists of a wash zone design wherein a recirculation loop is included in a wash-zone circulation system. The vapor product which is routed from the main fractionator column is converted into a two-phase flow by introduction of additional quench flow. The recirculation loop bypasses one or more spray headers of the wash zone and returns to a first end of the wash-zone circulation system. Entrained coke particles are filtered and separated out of the re-circulating fluid by filters.

Further, in an existing fractionator wash zone design includes means of addition of an external agent like slop wax. The system comprises a feed inlet distributor that reduces the amount of liquid entrained in vapor rising from the feed zone of the distillation column, a wash zone collection apparatus having an improved design for collecting slop wax falling from a liquid/vapor contacting structure provided in the wash zone, a recirculation subsystem for re-circulating at least a portion of the collected slop wax to the top of the wash zone for distribution as wash oil, and a control subsystem.

The conventional fractionator systems are associated with one or more design problems such as possibility of entrained of coke solids being deposited in wash zone baffles is increased, heavy hydrocarbon material from vapor can ascend to fractionator top section causing fouling in the upper section of fractionator, plugging of the spray header may also occur.

Other problems in the existing systems may arise due to addition of enhanced quench oil. This can result in increased vapor line size requirements, additional condensation of hydrocarbon liquid in the vapor line can also occur that may cause coking in the vapor line. Such problem has been generally observed in delayed coker units being operated worldwide. Since the particle sizes of coke vary from micron size to mm, gravity separation of these particles from hydrocarbon liquid may be difficult. Fouling can also occur in the circulating loop due to coke deposited in circular loop which resultant plugging of the spray header.

Further, the systems using wax slop as the quench media are generally not possible to design as wax slop availability is very rare. Moreover, wax slop has tendency to get mixed in the wash oil thereby causing contamination in the final product.

Thus, there lies an unmet need of effectively addressing all the aforementioned problems and overcome the issues pertaining to coking in wash zone and further improving the washing efficiency. There also lies need of providing apparatus that can achieve effective washing of the heavy hydrocarbon product vapor in the fractionator column of a delayed coker unit.

SUMMARY OF THE INVENTION

This summary is provided to introduce a selection of concepts in a simplified format that are further described in the detailed description of the present disclosure. This summary is not intended to identify key or essential inventive concepts of the present disclosure, nor is it intended for determining the scope of the present disclosure.

Accordingly, an aspect of the present disclosure is to provide an apparatus for washing hydrocarbon product vapor, where the apparatus comprises of housing, a first wash zone formed within the apparatus at a predefined cross-section of the housing. The first wash zone is for receiving the hydrocarbon product vapor coming from the coke drums. Further, the first wash zone comprises of a plurality of injection units located near the inner wall of the wash zone at predetermined intervals of the length of the housing corresponding to first wash zone such that the wash oil is injected towards inside of the wash zone. The plurality of injection units injects oil droplets formed from the received wash oil within the first wash zone to contact the hydrocarbon product vapor moving upwards through the wash zone. Thus, a primary washing of the product vapour occurs within the first wash zone. Further, the apparatus comprises a second wash zone defined at a predefined cross-section of the housing and located above and in fluid communication with the first wash zone. The second wash zone is for receiving the primary washed hydrocarbon vapor coming from the first wash zone and comprises one or more spray headers located horizontally covering a part of the surface area of horizontal plane for receiving wash oil and spraying oil droplets formed from the received wash oil in the vertically downward direction. The oil droplets contact the primary washed hydrocarbon vapor exiting the first wash zone and get further washed to produce secondary washed hydrocarbon vapor. In an example, the heavy refractory hydrocarbon molecules along with asphaltenes are removed further to make clean hydrocarbon product vapour stream for further separation in the upper section of fractionator column.

Another aspect of the present disclosure is to provide a method of washing of hydrocarbon product vapor coming from delayed coker drums. During first stage the method comprises of receiving hydrocarbon product vapor coming from delayed coker drums in a first wash zone and further receiving wash oil being supplied from a pump into a plurality of injection units. Further, the method comprises of injecting, oil droplets formed from the received wash oil by the plurality of injection units within the first wash zone to contact the hydrocarbon product vapor thereby, forming a primary washed hydrocarbon vapour in the first wash zone. During the second stage, the method comprises receiving the primary washed hydrocarbon vapor from first wash zone by a second wash zone that is located above and in fluid communication with the first wash zone. Further, the method comprises of receiving wash oil being supplied from the pump by one or more spray headers and spraying further oil droplets formed from the received wash oil within the second wash zone. Thereafter, the further oil droplets contact the primary washed hydrocarbon vapor and form a secondary washed hydrocarbon vapor in the second wash zone.

To further clarify the advantages and features of the present invention, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein.

Figure 1:
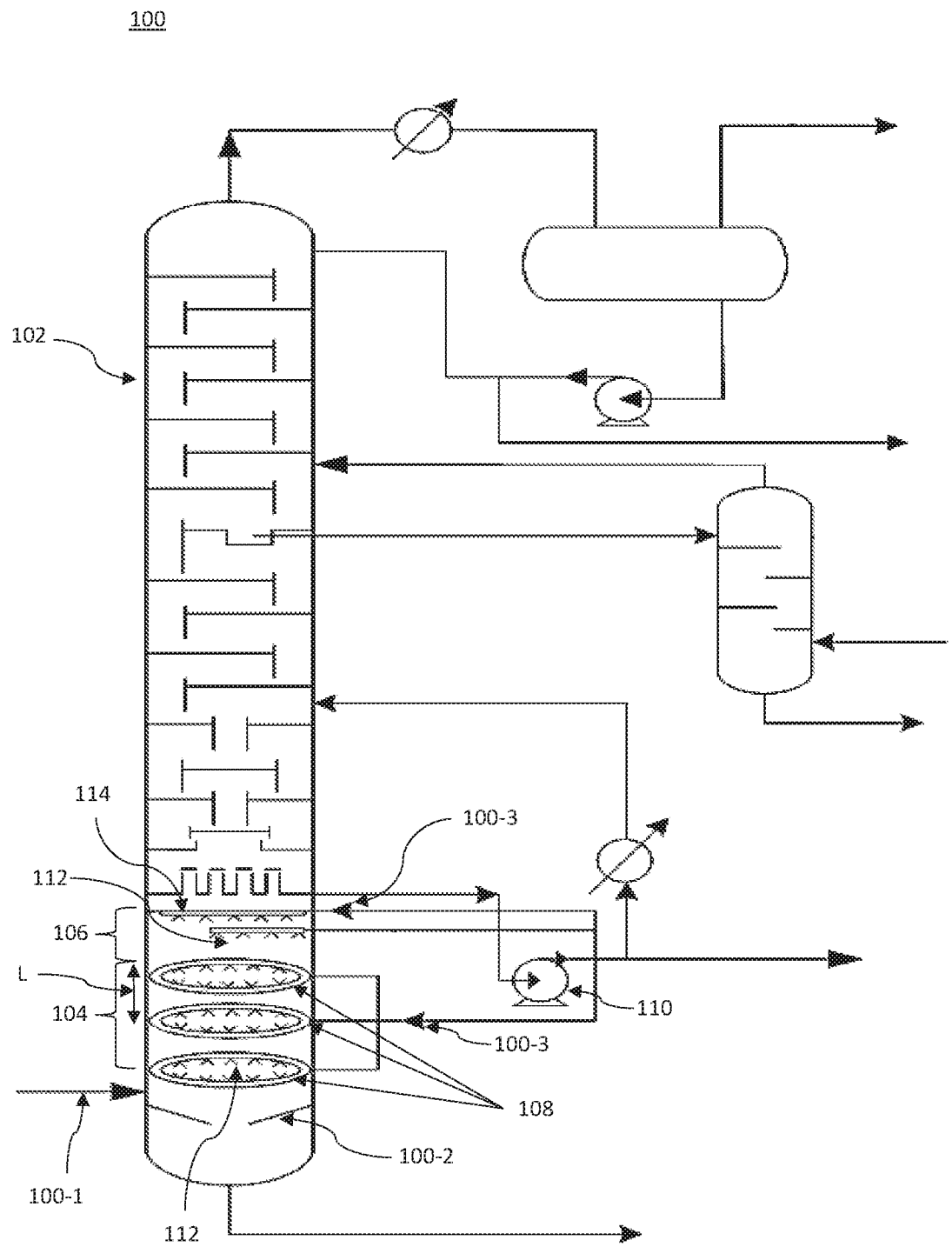
FIG. 1 illustrates a schematic view of an apparatus for washing hydrocarbon product vapor, in accordance with an embodiment of the present disclosure.

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present invention. Furthermore, in terms of the construction of the apparatus, one or more components of the apparatus may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

DETAILED DESCRIPTION

It should be understood at the outset that although illustrative implementations of the embodiments of the present disclosure are illustrated below, the present invention may be implemented using any number of techniques, whether currently known or in existence. The present disclosure should in no way be limited to the illustrative implementations, drawings, and techniques illustrated below, including the exemplary design and implementation illustrated and described herein, but may be modified within the scope of the appended claims along with their full scope of equivalents.

The term "some" as used herein is defined as "none, or one, or more than one, or all." Accordingly, the terms "none," "one," "more than one," "more than one, but not all" or "all" would all fall under the definition of "some." The term "some embodiments" may refer to no embodiments or to one embodiment or to several embodiments or to all embodiments. Accordingly, the term "some embodiments" are defined as meaning "no embodiment, or one embodiment, or more than one embodiment, or all embodiments."

The terminology and structure employed herein is for describing, teaching, and illuminating some embodiments and their specific features and elements and does not limit, restrict, or reduce the scope of the claims or their equivalents.

More specifically, any terms used herein such as but not limited to "includes," "comprises," "has," "consists," and grammatical variants thereof do NOT specify an exact limitation or restriction and certainly do NOT exclude the possible addition of one or more features or elements, unless otherwise stated, and furthermore must NOT be taken to exclude the possible removal of one or more of the listed features and elements, unless otherwise stated with the limiting language "MUST comprise" or "NEEDS TO include."

Whether or not a certain feature or element was limited to being used only once, either way it may still be referred to as "one or more features" or "one or more elements" or "at least one feature" or "at least one element." Furthermore, the use of the terms "one or more" or "at least one" feature or element do NOT preclude there being none of that feature or element, unless otherwise specified by limiting language such as "there NEEDS to be one or more . . . " or "one or more element is REQUIRED."

Unless otherwise defined, all terms, and especially any technical and/or scientific terms, used herein may be taken to have the same meaning as commonly understood by one having an ordinary skill in the art.

Reference is made herein to some "embodiments." It should be understood that an embodiment is an example of a possible implementation of any features and/or elements presented in the attached claims. Some embodiments have been described for the purpose of illuminating one or more of the potential ways in which the specific features and/or elements of the attached claims fulfill the requirements of uniqueness, utility, and non-obviousness.

Use of the phrases and/or terms such as but not limited to "a first embodiment," "a further embodiment," "an alternate embodiment," "one embodiment," "an embodiment," "multiple embodiments," "some embodiments," "other embodiments," "further embodiment", "furthermore embodiment", "additional embodiment" or variants thereof do NOT necessarily refer to the same embodiments. Unless otherwise specified, one or more particular features and/or elements described in connection with one or more embodiments may be found in one embodiment, or may be found in more than one embodiment, or may be found in all embodiments, or may be found in no embodiments. Although one or more features and/or elements may be described herein in the context of only a single embodiment, or alternatively in the context of more than one embodiment, or further alternatively in the context of all embodiments, the features and/or elements may instead be provided separately or in any appropriate combination or not at all. Conversely, any features and/or elements described in the context of separate embodiments may alternatively be realized as existing together in the context of a single embodiment.

Any particular and all details set forth herein are used in the context of some embodiments and therefore should NOT be necessarily taken as limiting factors to the attached claims. The attached claims and their legal equivalents can be realized in the context of embodiments other than the ones used as illustrative examples in the description below.

Embodiments of the present invention will be described below in detail with reference to the accompanying drawings.

In accordance with an embodiment of the present invention, an apparatus for washing a hydrocarbon product vapor is disclosed. 'Apparatus' as used herein includes a fractionator also known as a fractionating tower to be used in a heavy hydrocarbon cracking process. An outlet provided for the present apparatus allows a flow of product obtained in form of cracked hydrocarbon into the delayed coking or coker unit, as known in the art.

In accordance with an embodiment of the present invention, wash oil may be used for washing of hydrocarbon product vapor in the disclosed apparatus. The wash oil may include suitable washing mediums known in the art.

Further, the hydrocarbon product vapor which may be washed in the disclosed apparatus may include an entire range of distilled resids which may include coker naphtha, coker gas oil, Vacuum Gas Oil (VGO), hydrotreated vacuum gas oil (VGO), hydrocracker bottom, straight run naphtha, visbreaker naphtha, vacuum residue (VR), vacuum residue tar (VR tar), reduced crude oil (RCO) and combination thereof.

In accordance with an embodiment of the present invention, the hydrocarbon product vapour is washed at different stages within the apparatus. In accordance with a preferred embodiment, the hydrocarbon product vapour is washed in at least two stages. However, more than two stages may be construed from the foregoing description of the washing of the hydrocarbon product vapor with the wash oil within the disclosed apparatus.

The first stage may include washing of hydrocarbon product vapor when contacted by wash oil being pumped from a pump so as to produce a primary washed hydrocarbon vapor. In a preferred embodiment, the apparatus as disclosed provides a construction of injection units that facilitates the washing of hydrocarbon product vapor with the wash oil thus enabling the first stage of washing.

Further, the second stage may include further washing of hydrocarbon product vapor when contacted by wash oil being pumped from a pump so as to produce a secondary washed hydrocarbon vapor. In a preferred embodiment, the apparatus as disclosed provides a construction of spray headers that facilitates the washing of hydrocarbon product vapor with the wash oil thus enabling the secondary stage of washing.

Further, the parameters suitable for apparatus may include, but not limited to size of the nozzles or orifices and numbers thereof, wash oil supply pressure, wash oil flow rate. One or more parameters are determined so that the wash oil spray covers the cross section of the apparatus to the optimum.

Further, the skilled artisans will appreciate that the injection nozzles or headers can be fixed at desired locations within the apparatus by employing one or more mechanical means including, but not limited to, brackets, bolts.

The present apparatus and the method efficiently perform washing of hydrocarbon product vapour to remove refractory hydrocarbons and asphaltenes to produce cleaner hydrocarbon product vapor. In addition, the apparatus as disclosed in the foregoing description enables optimum contact of product vapour with wash oil droplets causing effective washing of the vapour and thereby maintaining improved mass transfer between product vapour and wash oil, reduced coking tendency in the wash zone due to minimum metal surface area.

Further, the present apparatus and method also result in reduced space requirement for wash zone section as the design of the wash zone does not include trays or packing material, therefore, within minimum height of the fractionator column assigned for the wash zone effective washing of the hydrocarbon product vapor takes place. The coking tendency in the wash zone also reduces significantly due to the incorporation of design of present invention.

FIG. 1 illustrates a schematic view of an apparatus 100 for washing of hydrocarbon product vapour, in accordance with an embodiment of the present invention. As illustrated, the apparatus 100 comprises a housing 102, at least a first wash zone 104, at least a second wash zone 106. Although, the first wash zone 104 and the second wash zone 106 are described for the purpose of understanding the present invention, it should not be construed as limiting the scope and the apparatus 100 may include more than two wash zones without departing from the scope of the present disclosure. Construction and operational details of the first wash zone 104 and the second wash zone 106 are explained in detail in the subsequent section of the present disclosure.

In particular, the first wash zone 104 is defined by walls of the housing 102 and formed across a predefined cross-section of the housing 102. The first wash zone 104 extends in a direction of flow of a primary washed hydrocarbon vapor obtained in the first wash zone 104. As illustrated, the first wash zone 104 receives hydrocarbon product vapor entering the apparatus 100 from a supply line that is in operational communication with the apparatus 100. For the sake of readability, the "hydrocarbon product vapor" is hereinafter interchangeably referred to as the "vapor", without departing from the scope of the present disclosure. Initially, on entering the apparatus 100, the vapor moves towards heat shield trays 100-2 located at the bottom of the apparatus 100. Thereafter, the vapor moves in an upward direction into the first wash zone 104 along a length L of the housing 102.

Further, the first wash zone 104 comprises of a plurality of injection units 108 that are located at predetermined intervals of length L corresponding to the first wash zone 104 through the housing 102. As an example, the predetermined intervals of the length L of location of plurality of injection units 108 may be, but not limiting to, in the range on 1 cm to 100 cm across the first wash zone 104. The plurality of injection units 108 receives wash oil as depicted by arrow 100-3 from a pump 110 which is operably connected to the apparatus 100. The pump 110 is in fluid communication with the first wash zone 104 and adapted to inject the received wash oil in form of oil droplets 112 within the first wash zone 104.

Figure 2:
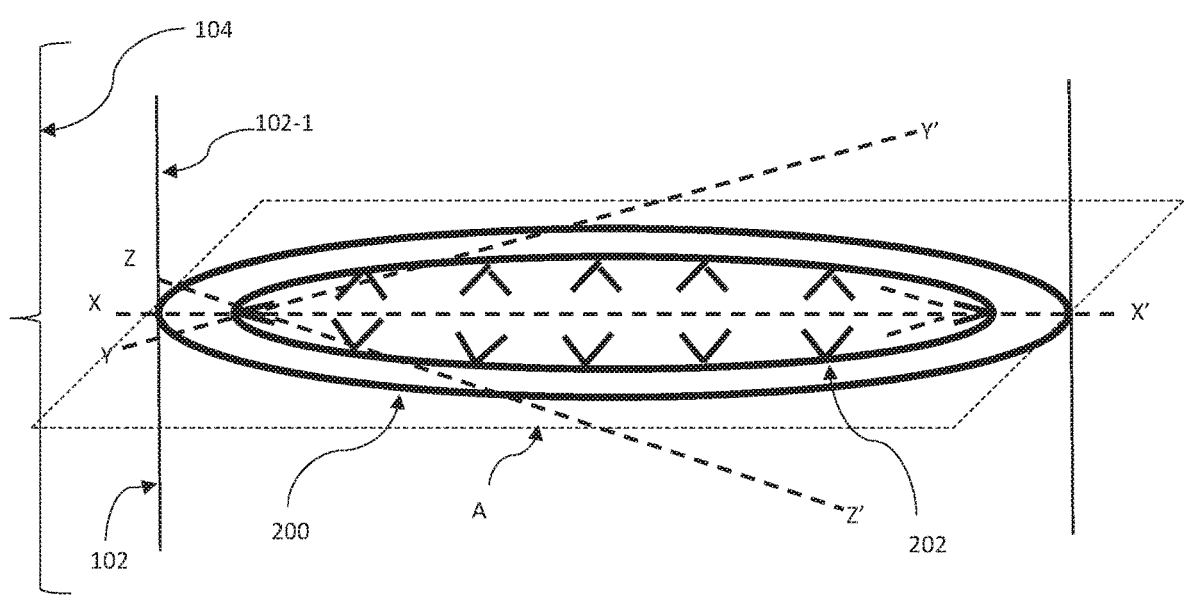
FIG. 2 illustrates a schematic view of an injecting unit provided in a first wash zone of the apparatus, in accordance with an embodiment of the present disclosure.

FIG. 2 illustrates a schematic view of an injecting unit 108 provided in a first wash zone 104 of the apparatus, in accordance with an embodiment of the present disclosure. Referring to FIG. 2, in the illustrated embodiment of the present disclosure, the plurality of injection units 108 which receives the wash oil may comprise of at least one spray ring 200. The at least one spray ring 200 may interchangeably be referred to as the spray ring 200. The spray ring 200 may be disposed on an inner wall 102-1 of the housing 102 that corresponds to the first wash zone 104. The spray ring 200 may include a plurality of injection nozzles 202 for injecting oil droplets 112 within the first wash zone 104. The plurality of injection nozzles 202 may be disposed across an inner circumference of the spray ring 200 so that injected oil droplets 112 are dispersed in the entire volume of the first wash zone 104.

In one implementation, the plurality of injection nozzles 202 may be oriented to inject oil droplets 112 in a horizontal direction parallel to a horizontal plane A of the cross section of the housing 102 corresponding to the first wash zone 104. In accordance with this implementation, the direction of injection of the oil droplets 112 is as depicted by way of dashed line XX' of the cross-section of the housing 102.

In other implementation the plurality of injection nozzles 202 may be oriented to inject oil droplets 112 at an angle of, but not limited to, 30 degrees above with respect to the horizontal plane A of the cross section of the housing 102 corresponding to the first wash zone 104. In accordance with this implementation, the direction of injection of the oil droplets 112 is depicted by way of dashed line YY'.

In another implementation, the plurality of injection nozzles 202 may be oriented to inject oil droplets 112 at an angle of, but not limited to, 30 degrees below with respect to the horizontal plane A of the cross section of the housing 102 corresponding to the first wash zone 104. In accordance with this implementation, the direction of injection of the oil droplets 112 is depicted by way of dotted line ZZ'.

In yet another implementation, the orientation of the plurality of injection nozzles 202 to inject oil droplets 112 may also be contemplated in each of the orientations depicted by way of dotted lines XX', YY' and ZZ' without departing from the scope of the present invention.

Figure 3:
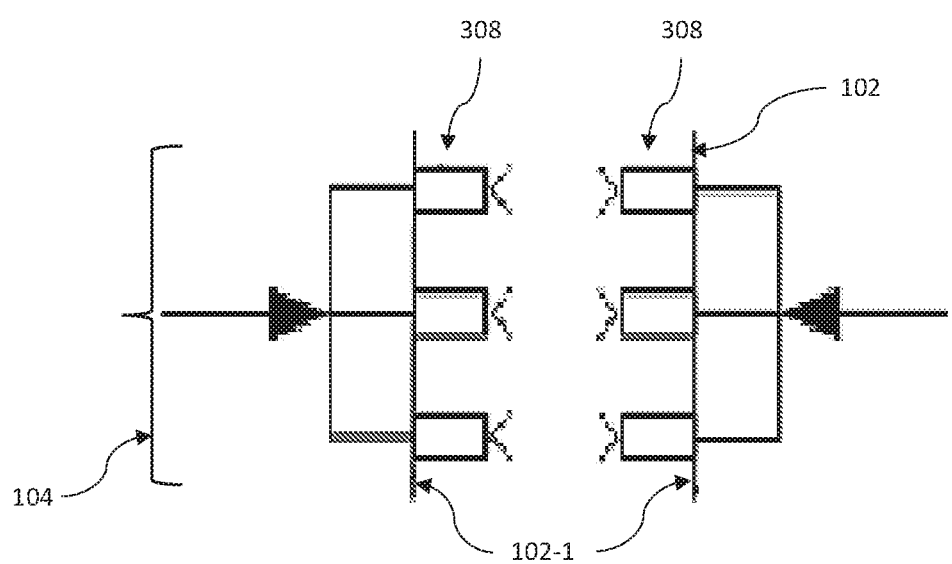
FIG. 3 illustrates a schematic view of another injecting unit provided in the first wash zone of the apparatus, in accordance with another embodiment of the present disclosure.

FIG. 3 illustrates a schematic view of another injecting unit 108 provided in the first wash zone 104 of the apparatus 100, in accordance with another embodiment of the present disclosure. In the illustrated embodiment of the present disclosure, the plurality of injection units 108, such as a plurality of injections units 308 are in fluid communication with the pump 110 so as to receive the wash oil being supplied from the pump 110 (not shown in figure). The plurality of injections units 308 may be disposed across the circumference on the inner wall 102-1 of the housing 102 that corresponds to the first wash zone 104. In an example the plurality of injections units 308 are disposed at a predefined vertical elevation on the inner wall 102-1 of the housing 102 that corresponds with the first wash zone 104. However, other arrangements of the plurality of the injection units 308 may also be contemplated without departing from the scope of the present invention.

Figure 4A:
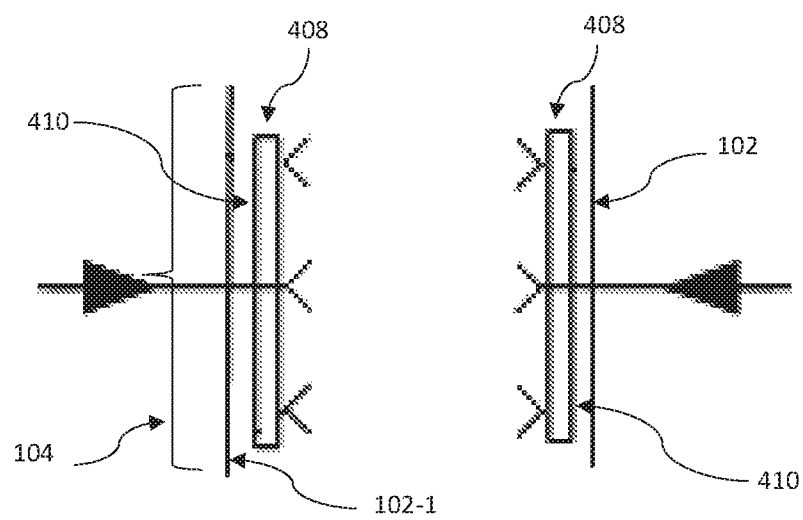
FIG. 4a illustrates a schematic view of another injecting unit provided in the first wash zone of the apparatus, in accordance with another embodiment of the present disclosure.
Figure 4B:
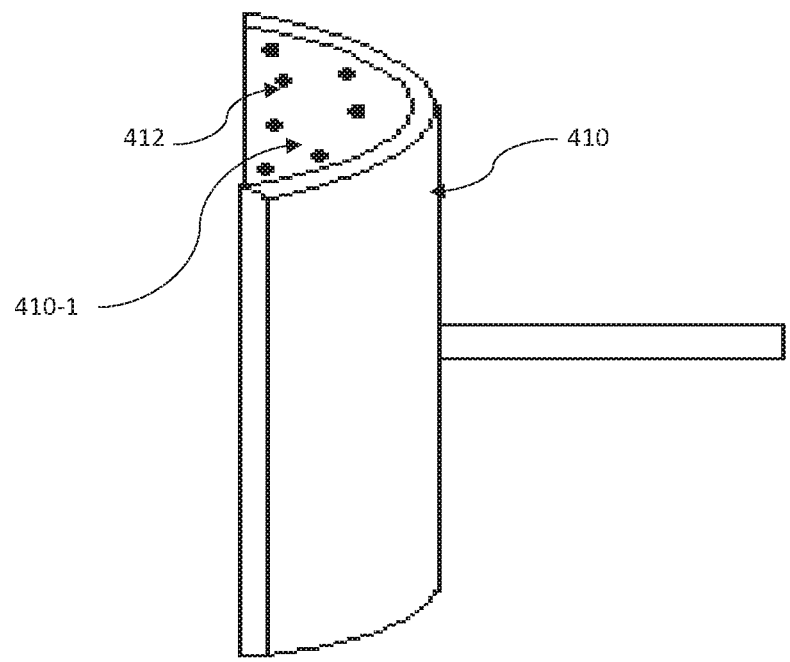
FIG. 4b illustrates a schematic view of a curved rectangular injection header provided in the injecting unit of the apparatus, in accordance with an embodiment of the present disclosure.

FIG. 4a illustrates a schematic view of another injecting unit 108 provided in the first wash zone 104 of the apparatus 100, in accordance with another embodiment of the present disclosure. FIG. 4b illustrates a schematic view of a curved rectangular injection header 410 provided in the injecting unit 108 of the apparatus 100, in accordance with an embodiment of the present disclosure. Referring to FIG. 4a, in the illustrated embodiment, the plurality of injection units 108, such as a plurality of injection units 408, may be in fluid communication with the pump 110 and receives the wash oil (not shown in the figure). Each of the plurality of injection units 408 may comprise of at least one curved rectangular injection header 410. The curved rectangular injection header 410 is disposed on the circumference on the inner wall 102-1 of the housing 102 that corresponds to the first wash zone 104. As illustrated in FIG. 4b, a plurality of orifices 412 may be disposed on an inner surface 410-1 of the one or more curved rectangular injection header 410. The plurality of orifices 412 is adapted to inject the received wash oil in form of oil droplets 112.

During the operation of the apparatus 100, oil droplets 112 injected from each of the plurality of injection units 108 act as the primary washing media for the hydrocarbon product vapor. Within the first wash zone 104, the oil droplets 112 come in contact and may impinge with the flowing vapor. This may result in the initial break-up of the vapor and thereby, forming a primary washed hydrocarbon vapor. In the present disclosure, this stage may also be referred to as the first stage of washing.

Referring to FIG. 1, the second wash zone 106 is located above the first wash zone 104 and configured to be in fluid communication the first wash zone 104. In particular, the second wash zone 106 is defined by the walls of the housing 102 and formed across a predefined cross-section of the housing 102. The second wash zone 106 extends in a direction of flow of a secondary washed hydrocarbon vapor obtained therein. As illustrated, the second wash zone 106 receives the primary washed hydrocarbon vapor entering from the first wash zone 104. The primary washed hydrocarbon vapor then gradually travels in an upward direction within the second wash zone 106.

Further, the second wash zone 106 comprises of one or more spray headers 114 that receive wash oil as depicted by arrow 100-3 from the pump 110 which is operably connected to the apparatus 100. Each of the spray headers 114 subsequently injects the received wash oil in form of oil droplets 112 within the second wash zone 106. In one implementation the one or more spray headers 114 may spray the oil droplets 112 in a vertically downward direction. However, the one or more spray headers 114 may spray the oil droplets 112 in other possible directions without departing from the scope of the present invention.

Figure 5:
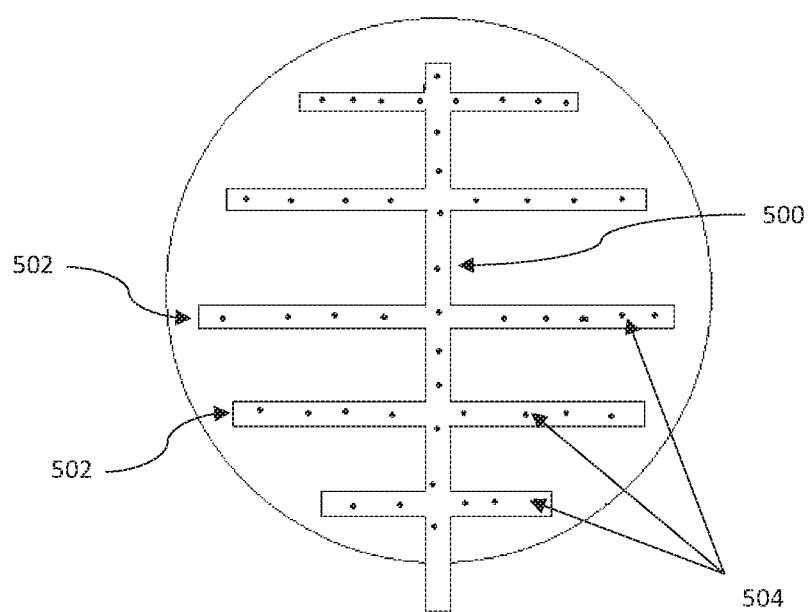
FIG. 5 illustrates a schematic view of a spray header provided in a second wash zone of the apparatus for washing of hydrocarbon product vapor, in accordance with an embodiment of the present disclosure.

FIG. 5 illustrates a schematic view of the spray header 114 provided in the second wash zone 106 of the apparatus 100, in accordance with an embodiment of the present disclosure. In the illustrated embodiment of the present disclosure, each of the spray headers 114 may comprise of at least one main pipe 500 to receive the wash oil being supplied from the pump 110 (not shown in figure). Further, the spray header 114 may comprise of a plurality of sub pipes 502 branching out from the main pipe 500 and in fluid communication with the main pipe 500. The wash oil flowing in the main pipe 500 gradually enters the plurality of sub pipes 502 and gets distributed in each of the sub pipes 502. The main pipe 500 and each of the sub pipes 502 include a plurality of orifices 504 to inject oil droplets 112 formed from the received wash oil. The oil droplets 112 are distributed within the cross section of the apparatus 100 corresponding to the second wash zone 106. In a preferred embodiment each of the plurality of orifices 504 may be disposed, but is not limited to, on a bottom of the main pipe 500 and on a bottom of the plurality of the sub pipes 502 to obtain substantially equal distribution of the oil droplets 112.

During further operation of the apparatus 100, the injected oil droplets 112 from each of one or more spray headers 114 act as the secondary washing media for the vapor. Within the second wash zone 106, the oil droplets 112 come in contact and may impinge with the gradually moving primary washed hydrocarbon vapor. This may result in the further washing of the primary washed hydrocarbon vapor thereby forming a secondary washed hydrocarbon vapor. In the present disclosure, this stage may also be referred to as the second stage of washing.

Figure 6:
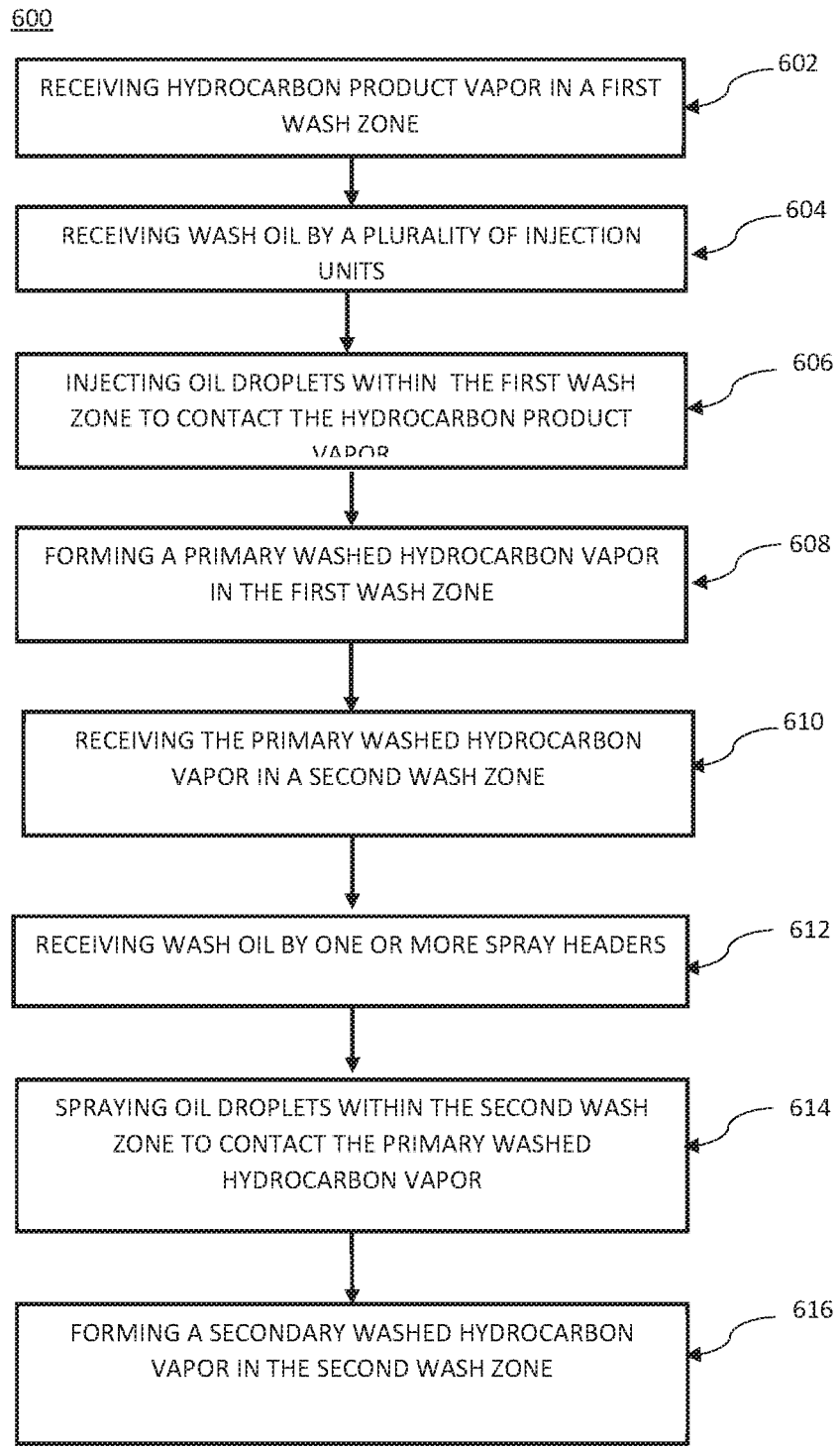
FIG. 6 illustrates a flowchart depicting a method for washing of hydrocarbon product vapor, in accordance with an embodiment of the present disclosure.

FIG. 6 illustrates a flowchart depicting a method 600 for washing the hydrocarbon product vapor using the apparatus 10, in accordance with an embodiment of the present disclosure. As illustrated in step 602, hydrocarbon product vapor is received by a first wash zone 104 from a supply line 100-1 which is in operational communication with the apparatus 100 as illustrated in FIG. 1. Further, in step 604, the method 600 may include receiving wash oil being supplied from a pump 110, by a plurality of injection units 108. More specifically, the pump 110 is operably connected to the apparatus 100 and in fluid communication with the first wash zone 104 and a second wash zone 106.

In step 606, the received wash oil is injected into the first wash zone 104 in form of oil droplets 112 through the plurality of injection units 108. As illustrated in step 608, the oil droplets 112 come in contact with and impinge the vapor so as to form a primary washed hydrocarbon vapor. In step 610, the primary washed hydrocarbon vapor then advances to and is received in a second wash zone 106 located above the first wash zone 104. Further, wash oil is introduced in the second wash zone 106 via the pump 110. In step 612, the wash oil is received by one or more spray headers 114 located within the second wash zone 106. In step 614, each of the spray headers 114 spray oil droplets 112 to contact the advancing primary washed hydrocarbon vapor and thereby, in step 616, forming secondary washed hydrocarbon vapor within the second wash zone 106.

While specific language has been used to describe the disclosure, any limitations arising on account of the same are not intended. As would be apparent to a person in the art, various working modifications may be made to the method in order to implement the inventive concept as taught herein. The scope of the embodiments is by no means limited by these specific examples.

The invention claimed is:

1. An apparatus for washing hydrocarbon product vapor, the apparatus comprising:
   a housing;
   a first wash zone formed within the apparatus at a predefined cross-section of the housing and adapted to receive hydrocarbon product vapor, wherein the first wash zone comprises:
   a plurality of injection units located at predetermined intervals of a length (L) of the first wash zone adapted to inject oil droplets to contact the hydrocarbon product vapor to form a primary washed hydrocarbon vapor, wherein the plurality of injection units comprises one or more curved rectangular injection headers disposed on an inner wall across a circumference of the housing corresponding to the first wash zone, and wherein the plurality of injection units are oriented to inject the oil droplets in a horizontal direction (XX') parallel to a horizontal plane A of the housing corresponding to the first wash zone; and
   a second wash zone located above and in fluid communication with the first wash zone within the predefined cross-section of the housing, the second wash zone adapted to receive the primary washed hydrocarbon vapor from the first wash zone, wherein the second wash zone comprises:
   one or more spray headers adapted to spray oil droplets to contact the primary washed hydrocarbon vapor to form a secondary washed hydrocarbon vapor.

2. The apparatus as claimed in claim 1, wherein the predetermined intervals of the length (L) of the location of the plurality of injection units across the first wash zone is in the range on 1 cm to 100 cm.

3. The apparatus as claimed in claim 1, wherein each of the plurality of injection units is disposed at a predefined vertical elevation on the inner wall across the circumference of the housing corresponding to the first wash zone.

4. The apparatus as claimed in claim 1, wherein the one or more curved rectangular injection headers comprises a plurality of orifices disposed on an inner surface of the one or more curved injection headers.

5. The apparatus as claimed in claim 1, wherein the one or more spray headers are adapted to spray oil droplets in a vertically downward direction within the second wash zone.

6. The apparatus as claimed in claim 1, wherein the one or more spray headers comprises:
   a main pipe; and
   a plurality of sub pipes branching from the main pipe and in fluid communication with the main pipe,
   wherein the main pipe and the sub pipe comprises a plurality of orifices disposed on a bottom of the main pipe and on a bottom of each of the plurality of sub-pipes to inject oil droplets.

7. A method of washing hydrocarbon product vapor, the method comprising:
   receiving, by a first wash zone, the hydrocarbon product vapor;
   receiving, by a plurality of injection units, wash oil being supplied from a pump, wherein the plurality of injection units comprises one or more curved rectangular injection headers disposed on an inner wall across a circumference of a housing corresponding to the first wash zone;
   injecting, by the plurality of injection units, oil droplets formed from the received wash oil within the first wash zone to contact the hydrocarbon product vapor, wherein the plurality of injection units inject the oil droplets in a horizontal direction (XX') parallel to a horizontal plane A of the housing corresponding to the first wash zone;
   forming, in the first wash zone, a primary washed hydrocarbon vapor;
   receiving, by a second wash zone located above and in fluid communication with the first wash zone, the primary washed hydrocarbon vapor;

receiving, by one or more spray headers, wash oil being supplied from the pump;

spraying, by the one or more spray headers, oil droplets formed from the received wash oil within the second wash zone to contact the primary washed hydrocarbon vapor; and forming, in the second wash zone, a secondary washed hydrocarbon vapor.

\* \* \* \* \*